United States Patent Office 3,347,795

Patented Oct. 17, 1967

3,347,795

IRIDIUM AND CHROMIUM DOPED LEAD ZIRCONATE TITANATE PIEZOELECTRIC CERAMIC COMPOSITION

Tsuneo Akashi, Masao Takahashi, Fumio Yamauchi, Norio Tsubouchi, and Tomeji Ohno, Shikokumachi, Japan, assignors to Nippon Electric Company, Limited, Minato-ku, Tokyo, Japan No Drawing. Filed Mar. 13, 1967, Ser. No. 622,457
Claims priority, application Japan, Mar. 12, 1963, 38/12,952
2 Claims. (Cl. 252—62.9)

ABSTRACT OF THE DISCLOSURE

Lead zirconate-lead titanate-lead stannate ($PbZrO_3$-$PbTiO_3$-$PbSnO_3$) piezoelectric ceramic compositions wherein calcium, strontium, or barium may replace a portion of the lead (Pb) contained in such compositions, and which contain iridium dioxide ($IrO_2$) and chromium sesquioxide ($Cr_2O_3$) in specified amounts to improve the electromechanical coupling factor and the mechanical quality factor of the ceramic.

This application is a continuation-inpart of application Ser. No. 622,364 filed Mar. 10, 1967, now abandoned, which in turn is a continuation of application Ser. No. 349,324 filed Mar. 4, 1964, now abandoned.

This invention relates generally to piezoelectric ceramic materials. More particularly, the invention relates to ceramic materials based upon lead zirconate-lead titanate ($PbZrO_3$-$PbTiO_3$) compositions, or on related lead zirconate-lead titanate-lead stannate ($PbZrO_3$-$PbTiO_3$-$PbSnO_3$) compositions. The present invention relates more specifically to such ceramic materials which contain, in addition to the basic compositions, iridium dioxide ($IrO_2$) in an amount of from 0.02 weight percent to 0.30 weight percent of the total weight, and also chromium sesquioxide ($Cr_2O_3$) in an amount of from 0.01 weight percent to 0.50 weight percent thereof.

Fundamental measures for evaluating the piezoelectric properties of a piezoelectric material are its electromechanical coupling factor and its mechanical quality factor. The electromechanical coupling factor represents the efficiency of transforming electric oscillations into mechanical vibrations and, conversely, of transforming mechanical vibrations into electric oscillations. The mechanical quality factor represents the reciprocal proportion of the energy consumed by the material during the electrical and mechanical energy interconversion. A larger mechanical quality factor corresponds to a smaller energy consumption my the material, and vice versa.

Recently, attention and studies have been directed to ceramic electric wave filters wherein use is made of piezoelectric ceramics as the filter element or elements; and to mechanical filters wherein use is also made of piezoelectric ceramics as the transducer or transducers thereof. The qualities desired for the piezoelectric ceramics employed in such applications are as follows:

For the elements of ceramic electric wave filters, the electromechanical coupling factor must have a desired value selected from a range between an extremely large value and a very small value, and the mechanical quality factor should have as great a value as possible. This criterion is described, for example, in "Electronic Engineering," vol. 33 (1961), No. 3, pp. 171–177, by R. C. V. Macario, entitled, "Design Data for Band-Pass Ladder Filters Employing Ceramic Resonators."

For the transducer elements of mechanical filters, both the electromechanical coupling factor and the mechanical quality factor must be as large as possible. Thus, the properties demanded for the elements of mechanical filters are consistent with that particular set of properties demanded for the elements of ceramic electric wave filters in which the electromechanical coupling factor is large.

It is accordingly among the objects of this invention to provide ferroelectric ceramic materials having both large electromechanical coupling factors and large mechanical quality factors, which materials are suitable for use as such elements in ceramic electric wave filters and mechanical filters.

It has previously been suggested to substitute various elements for the constituents of known piezoelectric ceramic materials. Materials incorporating such substitutions are described, for example, in "Journal of Research of the National Bureau of Standards," vol. 55 (1955), pages 239–254, by B. Jaffe, R. S. Roth, and S. Marzullo, and in U.S. Patents Nos. 2,708,244; 2,849,404; 2,906,710; 2,911,370; 3,006,857; 3,068,177; 3,144,411; and 3,216,943.

It has now been found that, in accordance with the present invention, the preceding objects may be effected by incorporating specified, critical proportions of iridium dioxide ($IrO_2$) and chromium sesquioxide ($Cr_2O_3$) in the basic piezoelectric material employed. The invention may be quantitatively expressed as residing in a piezoelectric ceramic material incorporating such additives in a basic composition having the formula $$(Pb_uA_v)(Zr_xTi_ySn_z)O_3$$

wherein A is calcium, strontium, or barium and $u$, $v$, $x$, $y$ and $z$ represent a set of molar ratios and such molar ratios are given by $u=0.75–1.00$,
$v=0.00–0.25$,
$u+v=1.00$,
$x=0.00–0.90$,
$y=0.10–0.60$,
$z=0.00–0.65$, and
$x+y+z=1.00$ Compositions outside of the suggested ranges are not practically operable because of their seriously reduced electromechanical coupling factors. The largest electromechanical coupling factor is obtainable in cases in which $x$, $y$ and $z$ are in the vicinities of 0.52–0.54, 0.48–0.46 and 0.00, respectively. Such compositions have been found to exhibit particularly strong piezoelectric activities which are stable with respect to both temperature and time.

The iridium dioxide and chromium sesquioxide additives are incorporated in the preceding basic composition in the proportions of from 0.02 to 0.30 weight percent of the iridium dioxide, and from 0.01 to 0.50 weight percent of the chromium sesquioxide. It is to be noted, as will be explained hereinafter by way of example, that the addition of both the iridium dioxide and chromium sesquioxide additives in the amounts specified has been found to provide marked and synergistic improvements in the electromechanical coupling factor and mechanical quality factor of the basic piezoelectric ceramic materials employed. In fact, it is the use of such additives in the indicated proportions which is essential to the performance of the present invention.

The ferroelectric compositions of the invention may be provided by the addition of various compounds containing iridium and chromium ions to the basic lead zirconate-lead titanate-lead stannate ceramic materials. Thus, iridium compounds such as iridium trichloride ($IrCl_3$) may be utilized to provide an amount of iridium ions equivalent to that derived from iridium dioxide ($IrO_2$). Similarly, chromium compounds (for example, $Cr_2(SO_4)_3$), other than chromium sesquioxide ($Cr_2O_3$), may be used in the ceramic material so as to provide an amount of chromium ions equal to the proportion provided by chromium sesquioxide ($Cr_2O_3$) when such material is added per se to the ceramic composition. Iridium and chromium compounds so useful must, however, decompose into the specified iridium and chromium oxides, respectively, at elevated temperatures. Thus, it should be understood that any such decomposable iridium and chromium compounds may be employed in the manufacture of the compositions of this invention, in lieu of the iridium dioxide and chromium sesquioxide additives incorporated per se in the compositions described in the preferred embodiments of the invention set forth hereinafter.

The following examples are intended as illustrative of the ferroelectric ceramic materials of the present invention. It will, of course, be understood that various changes may be made in the specific compositions of such examples, without departing from the scope of the present invention.

*Examples 1–8*

A basic lead titanate-lead zirconate ceramic composition having the formula $Pb(Zr_{0.54}Ti_{0.46})O_3$ was prepared by mixing 50 mole percent of lead monoxide (PbO), 27 mole percent of zirconium dioxide ($ZrO_2$), and 23 mole percent of titanium dioxide ($TiO_2$). Varying proportions of iridium dioxide and chromium sesquioxide were added alone or in admixture, to individual portions of such mixture to produce the ceramic compositions of the several examples and control formulations set forth in Tables I and II below.

Each sample and control mixture was first mixed in a ball mill, presintered at 900° C. for one hour, crushed, press-molded into discs, and thereafter sintered at 1300° C. for a further hour. The resulting ceramic discs were then provided with silver electrodes and piezoelectrically activated by a polarization treatment at 100° C. for an hour under an electric field of 50 kv./cm. The discs were then permitted to stand for 24 hours, after which the electromechanical coupling factor ($k_r$) for the radial mode vibration and the mechanical quality factor ($Q_m$) of the respective compositions were measured.

It is parenthetically noted that the polarization treatment of the ceramic compositions must, in all cases, be carried out at temperatures about 50° to 150° C. above room temperature, in accordance with the practice of the present invention. Such is the case since it has been found that the use of polarizing treatment at lower temperatures, e.g., at room temperature, reduces the value of the factor $k_r$, contra to the objects of this invention.

The $k_r$ and $Q_m$ factors were determined in accordance with the techniques described in Sections 2.1.3 and 2.1.7 of the "IRE Standards on Piezoelectric Crystals: Measurements of Piezoelectric Ceramics, 1961," published in the Proceedings of the IRE, vol. 49, No. 7 (July 1961), pages 1161–1169.

The electromechanical coupling factors and mechanical quality factors of the respective compositions prepared in accordance with the invention are given in Table I for Examples 1–8, whereas the corresponding characteristics of control formulations from which one or both of the iridium dioxide and chromium sesquioxide additives were omitted, are given in Table II for control compositions 1–12, respectively.

TABLE I.—ELECTROMECHANICAL COUPLING FACTOR AND MECHANICAL QUALITY FACTOR OF CERAMICS OF INVENTION

| Example No. | Basic Composition | Additive, Wt. (percent) | | $k_r$ (percent) | $Q_m$ |
|---|---|---|---|---|---|
| | | $IrO_2$ | $Cr_2O_3$ | | |
| 1 | $Pb(Zr_{.54}Ti_{.46})O_3$ | 0.02 | 0.01 | 52 | 640 |
| 2 | $Pb(Zr_{.54}Ti_{.46})O_3$ | 0.03 | 0.30 | 54 | 320 |
| 3 | $Pb(Zr_{.54}Ti_{.46})O_3$ | 0.05 | 0.10 | 52 | 600 |
| 4 | $Pb(Zr_{.54}Ti_{.46})O_3$ | 0.10 | 0.10 | 55 | 560 |
| 5 | $Pb(Zr_{.54}Ti_{.46})O_3$ | 0.10 | 0.50 | 55 | 320 |
| 6 | $Pb(Zr_{.54}Ti_{.46})O_3$ | 0.20 | 0.10 | 60 | 500 |
| 7 | $Pb(Zr_{.54}Ti_{.46})O_3$ | 0.30 | 0.01 | 58 | 450 |
| 8 | $Pb(Zr_{.54}Ti_{.46})O_3$ | 0.30 | 0.05 | 55 | 450 |

TABLE II.—ELECTROMECHANICAL COUPLING FACTOR AND MECHANICAL QUALITY FACTOR OF CERAMIC CONTROL COMPOSITIONS

| Example No. | Basic Composition | Additive, Wt. (percent) | | $k_r$ (percent) | $Q_m$ |
|---|---|---|---|---|---|
| | | $IrO_2$ | $Cr_2O_3$ | | |
| 1 | $Pb(Zr_{.54}Ti_{.46})O_3$ | | | 48 | 300 |
| 2 | $Pb(Zr_{.54}Ti_{.46})O_3$ | 0.10 | | 55 | 305 |
| 3 | $Pb(Zr_{.54}Ti_{.46})O_3$ | 0.15 | | 58 | 345 |
| 4 | $Pb(Zr_{.54}Ti_{.46})O_3$ | 0.20 | | 60 | 350 |
| 5 | $Pb(Zr_{.54}Ti_{.46})O_3$ | 0.25 | | 56 | 345 |
| 6 | $Pb(Zr_{.54}Ti_{.46})O_3$ | 0.30 | | 52 | 325 |
| 7 | $Pb(Zr_{.54}Ti_{.46})O_3$ | | 0.01 | 32 | 270 |
| 8 | $Pb(Zr_{.54}Ti_{.46})O_3$ | | 0.05 | 27 | 550 |
| 9 | $Pb(Zr_{.54}Ti_{.46})O_3$ | | 0.10 | 41 | 770 |
| 10 | $Pb(Zr_{.54}Ti_{.46})O_3$ | | 0.20 | 48 | 750 |
| 11 | $Pb(Zr_{.54}Ti_{.46})O_3$ | | 0.30 | 40 | 680 |
| 12 | $Pb(Zr_{.54}Ti_{.46})O_3$ | | 0.50 | 36 | 520 |

It will be noted from the tabulated data for Examples 1–8 that the addition of both iridium dioxide and chromium sesquioxide to the same basic ceramic composition results in a marked increase in the values of both the factors $k_r$ and $Q_m$. On the other hand, as will be noted from the data for control compositions 1–6 in Table II, the addition of solely coresponding proportions of iridium dioxide does not effect a corresponding increase in the value of $Q_m$. Conversely, the addition of solely chromium sesquioxide to the identical basic ceramic composition actually results in a decrease in the value of the $k_r$ factor. It is thus surprising that the simultaneous addition of both the iridium dioxide and chromium sesquioxide additives, in the proportions indicated, effects a simultaneous marked increase in the values of both the $k_r$ and $Q_m$ factors.

It will thus be seen that the simultaneous addition of both iridium dioxide and chromium sesquioxide to the basic ceramic composition provides piezoelectric materials of particular utility in ceramic wave filters, in which large $k_r$ factors are required, and in transducers of mechanical filters.

*Examples 9–19*

Additional ceramic compositions were prepared in the manner described in connection with Examples 1–8 above. In addition to the several compositions prepared in accordance with the invention, control samples were prepared in which no additives were incorporated or, alternatively, in which solely the $IrO_2$ additive was provided. The $k_r$ and $Q_m$ factors were thereafter measured for each ceramic composition in the manner described hereinabove.

Examples 9–11 and control samples 9A, 9B; 10A, 10B; and 11A, 11B (the control compositions designated by the letter A did not contain any $IrO_2$ or $Cr_2O_3$ additive, while the control compositions designated by the letter B incorporated solely the $IrO_2$ additive) were prepared from basic lead zirconate-lead titanate compositions of the formula $Pb(Zr_xTi_{1-x})O_3$, wherein $x$ was 0.50, 0.52 and 0.56. The iridium dioxide and chromium sesquioxide additives were each incorporated in amounts of 0.10 weight percent of the complete test compositions, as set forth more fully in Table III below.

Examples 14 and 15 were directed to test and control samples incorporating a basic composition of the formula $Pb(Zr_xTi_ySn_z)O_3$, wherein 0.49, 0.46 and 0.05 were selected for $x$, $y$, and $z$, respectively, in Example 14 and 0.44, 0.46 and 0.10 were selected for $x$, $y$, and $z$, respectively, in Example 15. No additives were incorporated in the control compositions 14A and 15A, whereas 0.10 weight percent of iridium dioxide was incorporated in each of the control samples 14B and 15B.

The compositions of Examples 16–19, and control samples 16A–19A were prepared by substituting barium (Example 16 and control 16A), strontium (Examples 17 and 18 and controls 17A and 18A), and calcium (Example 19 and control 19A) for portions of the lead constituent in basic ceramic compositions of the formula $Pb(Zr_xTi_y)O_3$. The alakaline earth metal constituents were thus substituted for 2 atom percent of the lead in the basic composition of Example 4 and 6 atom percent of the lead in the composition of Example 14.

The piezoelectric characteristics of the compositions of the preceding examples and control samples are set forth below in Table III.

$Q_m$ of piezoelectric ceramic compositions of the indicated class are manifestly and surprisingly simultaneously improved by the addition of both iridium dioxide and chromium sesquioxide thereto in amounts of from 0.02 weight percent to 0.03 weight percent and 0.01 weight percent to 0.50 weight percent, respectively. It will be understood that various changes may be made in the proportions of the specific constituents of the several ceramic compositions identified in the preceding examples without departing from the scope of the invention. Accordingly, the preceding description is intended as illustrative only and should not be construed in a limiting sense.

TABLE III.—ELECTROMECHANICAL COUPLING FACTOR AND MECHANICAL QUALITY FACTOR OF CERAMICS OF INVENTION AS COMPARED WITH CONTROL COMPOSITIONS

| Example or Control No. | Basic Composition | Weight Percent $IrO_2$ | Weight Percent $Cr_2O_3$ | $k_r$ (percent) | $Q_m$ |
|---|---|---|---|---|---|
| 9 | $Pb(Zr_{0.50}Ti_{0.50})O_3$ | 0.10 | 0.10 | 43 | 820 |
| 9A* | $Pb(Zr_{0.50}Ti_{0.50})O_3$ | ---------- | ---------- | 29 | 340 |
| 9B* | $Pb(Zr_{0.50}Ti_{0.50})O_3$ | 0.10 | ---------- | 41 | 535 |
| 10 | $Pb(Zr_{0.52}Ti_{0.48})O_3$ | 0.10 | 0.10 | 54 | 650 |
| 10A* | $Pb(Zr_{0.52}Ti_{0.48})O_3$ | ---------- | ---------- | 45 | 350 |
| 10B* | $Pb(Zr_{0.52}Ti_{0.48})O_3$ | 0.10 | ---------- | 53 | 370 |
| 11 | $Pb(Zr_{0.56}Ti_{0.44})O_3$ | 0.10 | 0.10 | 46 | 770 |
| 11A* | $Pb(Zr_{0.56}Ti_{0.44})O_3$ | ---------- | ---------- | 43 | 340 |
| 11B* | $Pb(Zr_{0.56}Ti_{0.44})O_3$ | 0.10 | ---------- | 46 | 610 |
| 12 | $Pb(Zr_{0.47}Ti_{0.53})O_3$ | 0.10 | 0.10 | 40 | 980 |
| 13 | $Pb(Zr_{0.45}Ti_{0.55})O_3$ | 0.10 | 0.10 | 32 | 1,150 |
| 14 | $Pb(Zr_{0.49}Ti_{0.46}Sn_{0.05})O_3$ | 0.10 | 0.10 | 55 | 580 |
| 14A* | $Pb(Zr_{0.49}Ti_{0.46}Sn_{0.05})O_3$ | ---------- | ---------- | 46 | 330 |
| 14B* | $Pb(Zr_{0.49}Ti_{0.46}Sn_{0.05})O_3$ | 0.10 | ---------- | 53 | 320 |
| 15 | $Pb(Zr_{0.44}Ti_{0.46}Sn_{0.10})O_3$ | 0.10 | 0.10 | 56 | 550 |
| 15A* | $Pb(Zr_{0.44}Ti_{0.46}Sn_{0.10})O_3$ | ---------- | ---------- | 45 | 350 |
| 15B* | $Pb(Zr_{0.44}Ti_{0.46}Sn_{0.10})O_3$ | 0.10 | ---------- | 52 | 330 |
| 16 | $Pb_{0.98}Ba_{0.02}(Zr_{0.54}Ti_{0.46})O_3$ | 0.10 | 0.10 | 58 | 580 |
| 16A* | $Pb_{0.98}Ba_{0.02}(Zr_{0.54}Ti_{0.46})O_3$ | ---------- | ---------- | 47 | 270 |
| 17 | $Pb_{0.98}Sr_{0.02}(Zr_{0.54}Ti_{0.46})O_3$ | 0.10 | 0.10 | 56 | 600 |
| 17A* | $Pb_{0.98}Sr_{0.02}(Zr_{0.54}Ti_{0.46})O_3$ | ---------- | ---------- | 48 | 280 |
| 18 | $Pb_{0.94}Sr_{0.06}(Zr_{0.49}Ti_{0.46}Sn_{0.05})O_3$ | 0.10 | 0.10 | 57 | 600 |
| 18A* | $Pb_{0.94}Sr_{0.06}(Zr_{0.49}Ti_{0.46}Sn_{0.05})O_3$ | ---------- | ---------- | 46 | 320 |
| 19 | $Pb_{0.98}Ca_{0.02}(Zr_{0.54}Ti_{0.46})O_3$ | 0.10 | 0.10 | 55 | 620 |
| 19A* | $Pb_{0.98}Ca_{0.02}(Zr_{0.54}Ti_{0.46})O_3$ | ---------- | ---------- | 45 | 320 |

*Control compositions are designated by the letters A or B, each control composition A consisting of the basic ceramic material without the addition of any $IrO_2$ or $Cr_2O_3$ additive, and each control composition B consisting of such material incorporating solely the $IrO_2$ additive.

It will be noted from a consideration of the data presented for Examples 9–19, as compared with the various control formulations tabulated in Table III, that both the $k_r$ and $Q_m$ factors of the compositions of the invention are, in every case, equal to or substantially greater than the respective factors for the corresponding control compositions. In particular, it will be noted from Examples 9, 10, 11, 14 and 15, as compared with controls 9B, 10B, 11B, 14B and 15B, respectively, that the compositions of the invention possessed superior $k_r$ factors as compared with compositions incorporating solely the $IrO_2$ additive (the $k_r$ factors of the respective compositions were the same in solely Example 11 and control 11B). Thus, although the addition of chromium sesquioxide alone to ferro-electric ceramic compositions effects a decrease of the $k_r$ factor, it was found that the simultaneous addition of such additive and iridium dioxide actually provides ceramic compositions exhibiting greater $k_r$ factors than exhibited by compositions incorporating solely an iridium dioxide additive.

It may further be noted, by a comparison of the $k_r$ and $Q_m$ factors exhibited by the ceramic composition of Example 4 with the corresponding characteristics of the compositions of Examples 9–19 that, within the ranges specified hereinabove, variation of the zirconium or titanium content, substitution of tin or substitution of barium, strontium or calcium, in the basic ceramic composition does not deleteriously effect the piezoelectric properties exhibited thereby in the presence of the specified proportions of iridium dioxide and chromium sesquioxide additives.

As noted in the preceding examples, the electromechanical coupling factor $k_r$ and the mechanical quality factor

What is claimed is:

1. A piezoelectric ceramic composition having a basic composition of the formula:

$$(Pb_uA_v)(Zr_xTi_ySn_z)O_3$$

wherein A is at least one member selected from the group consisting of calcium, strontium, and barium and $u$, $v$, $x$, $y$, and $z$ are given by $u=0.75–1.00$,
$v=0.00–0.25$,
$u+v=1.00$,
$x=0.00–0.90$,
$y=0.10–0.60$,
$z=0.00–0.65$, and
$x+y+z=1.00$, and incorporating iridium dioxide and chromium sesquioxide in amounts of from 0.02 to 0.30 weight percent iridium dioxide and from 0.01 to 0.50 weight percent chromium sesquioxide.

2. The piezoelectric ceramic composition of claim 1, wherein $x$ and $y$ vary from 0.52–0.54 and 0.48–0.46, respectively, and wherein $z$ is 0.00.

References Cited

UNITED STATES PATENTS 3,216,934 11/1965 Jaffe et al. ---------- 252—62.9

TOBIAS E. LEVOW, *Primary Examiner.*

R. D. EDMONDS, *Assistant Examiner.*